L. KELLY.
HAY STACKING MACHINE.
APPLICATION FILED DEC. 6, 1919.
1,348,178.
Patented Aug. 3, 1920.
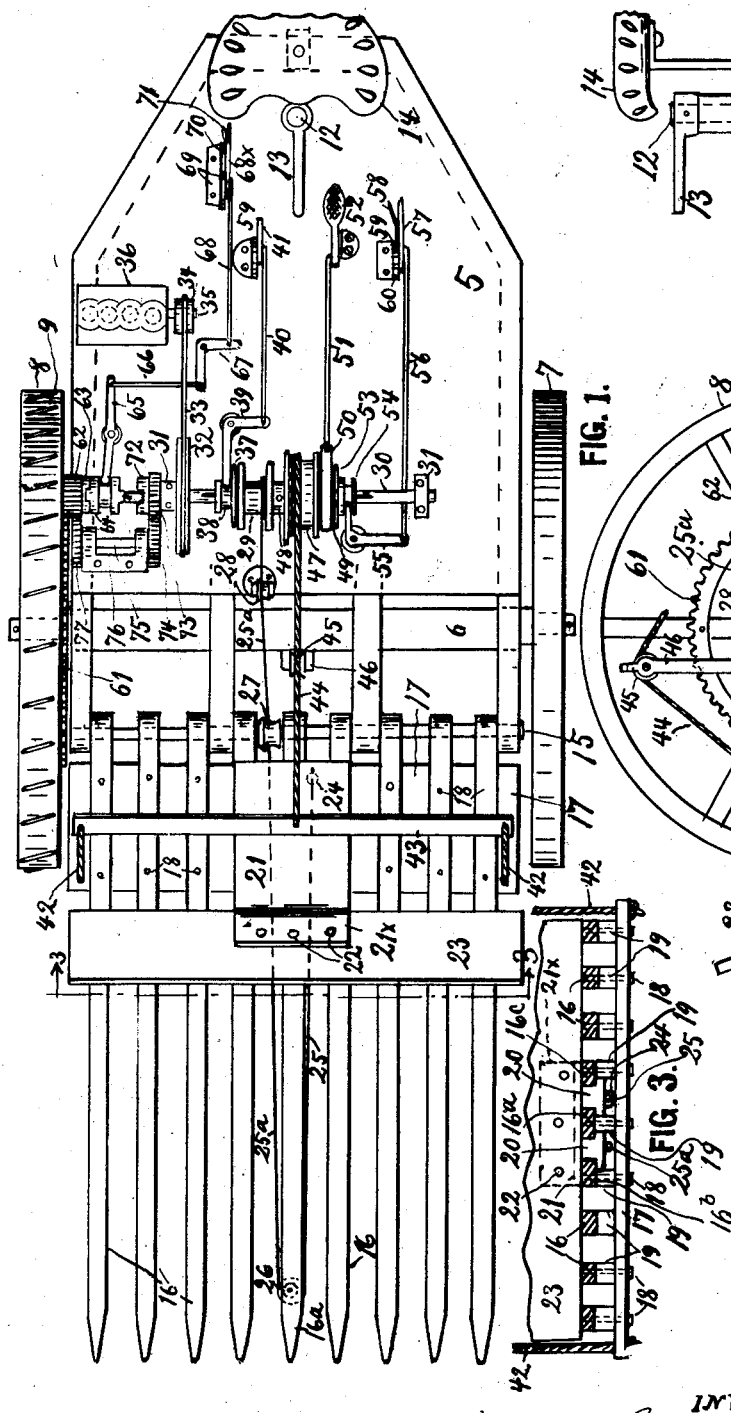
FIG. 1.
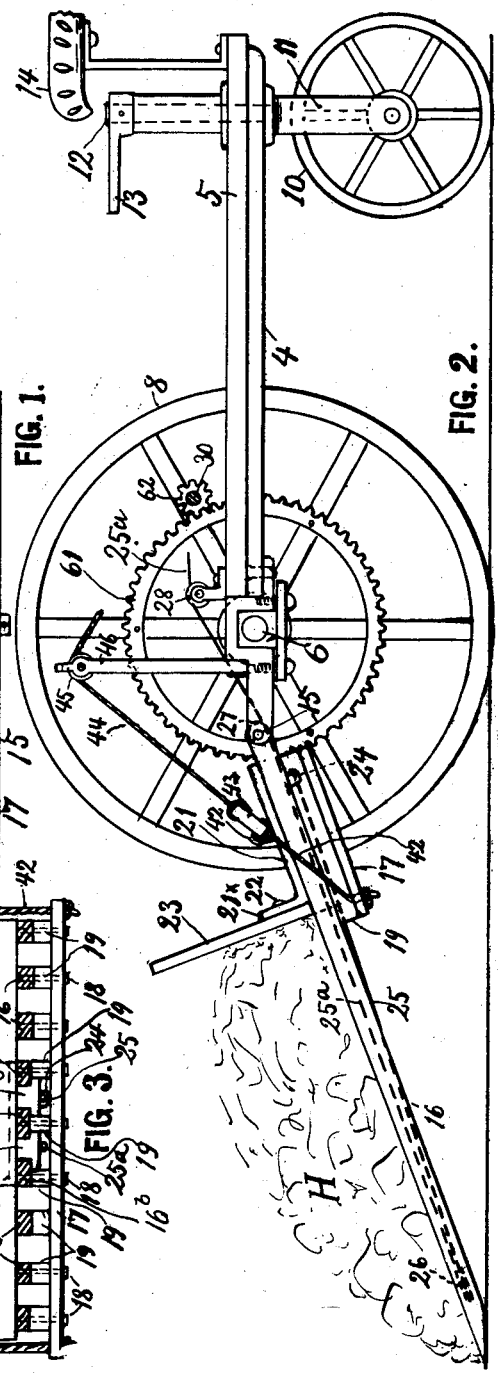
FIG. 2.
FIG. 3.
INVENTOR:
Lawrence Kelly.
BY his ATTORNEY:
A. M. Carlsen.

UNITED STATES PATENT OFFICE.

LAWRENCE KELLY, OF ST. PAUL, MINNESOTA.

HAY-STACKING MACHINE.

1,348,178. Specification of Letters Patent. Patented Aug. 3, 1920.

Application filed December 6, 1919. Serial No. 343,091.

*To all whom it may concern:*

Be it known that I, LAWRENCE KELLY, a citizen of the United States, residing at St. Paul, in the county of Ramsey and State of Minnesota, have invented a new and useful Hay-Stacking Machine, of which the following is a specification.

This invention relates to devices for gathering and stacking hay and for gathering grain bundles or shocks and bringing them to a threshing machine; but for shortness it may be termed a haystacker. The object of the invention is to provide an improved device for the purposes already mentioned.

In the accompanying drawing:

Figure 1 is a plan view of my hay stacking machine. Fig. 2 is a side elevation of Fig. 1 with one of the ground wheels removed and such other parts omitted as are clearly understood from Fig. 1. Fig. 3 is a cross section on the line 3—3 in Fig. 1.

Referring to the drawing by reference numerals, the body of the machine consists mainly of a frame 4 upon which is secured a platform 5 and which is supported by a transverse axle 6 and two ground wheels 7 and 8, the latter of which is provided with cleats 9, (shown in Fig. 1). The rear end of the frame is supported by a steering wheel 10, journaled in a fork 11, which has a journaled stem 12 with a steering arm 13 arranged in front of a seat 14, so that the operator occupying said seat may steer by applying one of his legs or knees at each side of the arm and thus have his hands free for other operations as will presently be described.

Pivoted to the front end of the frame by a pintle rod 15, or other pivots, is the rear end of a large fork or push rake, which is composed of a series of tines 16, secured upon a cross board 17, by bolts, or screws 18, passed through the board and interposed spacing blocks 19. In Fig. 3 is best shown that the three spacing blocks near the middle of the fork or rake are narrower than the tines, so as to give room for inverted T-shaped ribs 20, to engage under the adjacent tines, 16$^a$, 16$^b$, 16$^c$. Said ribs are portions of a sliding head 21, having a flange 21$^x$, secured at 22, to a cross board 23, which serves to push the hay off from the rake and upon the haystack.

The head 21 is connected at 24 to one end of a rope 25, which is passed over a sheave 26 arranged in a slot near the front end of the middle tine 16$^a$, and passed thence rearwardly as 25$^a$, is guided by sheaves 27 and 28 and secured to a drum 29, which is normally loose on a shaft 30. Said shaft is journaled in suitable bearings 31 upon the platform and has affixed to it a pulley 32, driven by a belt 33 from a pulley 34, fixed on the shaft 35 of a gasolene engine 36.

At one end of the drum 29, is a friction face adapted to be engaged by a friction disk 37, whose hub is slidably keyed on the shaft and provided with a peripheral groove 38, which is engaged by a shifter 39, having a rod 40 controlled by a hand lever 41.

The rake is lowered by its own weight, and raised to an incline by having two flexible elements 42, secured to the cross board 17, and to a cross bar 43, to the middle of which is secured a rope 44, which is guided over a pulley 45, in a post 46, and is secured to a drum 47, which is loose on the shaft 30, and resisted by a collar 48, against sliding movement. The other end of the drum is provided with a brake pulley 49, adapted to be engaged by a brake band 50, having a rod 51, and a pedal 52, by which the band may be tightened about the face of the pulley and thus hold the rake at any desired inclination. The said pulley also constitutes a friction clutch member, adapted to be engaged by a friction disk 53, having a peripherally grooved hub 54, slidably keyed on the shaft and slidable thereon by a shifter 55, a rod 56, and a hand lever 57, the latter is mounted on a notched sector 60, and provided with a finger lever 58, operating a dog 59, adapted to engage in the notches of the sector.

Fixed on the bull-wheel 8, is a gear 61, with which meshes constantly a gear pinion 62, which is normally loose on shaft 30, and is provided with clutch teeth 63, adapted to be engaged by double-faced clutch member 64, which is slidably keyed on the shaft 30, and may be shifted by a lever 65, rod 66, bell crank-lever 67, rod 68, and a hand lever 68$^x$, which is fulcrumed on a sector 69, having three notches for a catch 70, controlled by a finger lever 71, to engage.

The other clutch face of clutch member 64, is arranged for engagement with a clutch member 72, which is fixed to a gear 73, with the latter gear meshes another gear 74, which is fixed on a short shaft 75, journaled in a bracket 76, and at its other end carries a fixed gear 77, meshing with the loose gear 62.

In the operation of the machine, if the machine is to travel forward on the ground the clutch member 64 is thrown into engagement with the member 63, and if the machine is to move backward, the member 64, is thrown with its other end into the clutch member 72; and if the machine is to stand still, the member 64 is set idle between the members 62 and 72, by placing the dog 70 of the lever 68× in the middle notch of the sector 69.

The use of the levers and pedals being thus explained, it may be further stated that in the operation of the machine the operator lowers the rake to the ground at the end of each windrow of hay, and lets the machine move forward until the rake is filled with hay as indicated at letter H in Fig. 2. He then raises the rake to a level or some upward incline, and lets the machine travel to the unloading place, which is usually a hay stack, there he raises the front end of the rake to the top of the stack, and then applies the drum 29, which causes the ejector 23; to move forward till it projects partly beyond the front ends of the tines 16, and thus removes all the hay from the rake. The machine then backs sufficiently to let the ejector slide to the rear end of the rake. The machine is then driven to the windrow again and the operation repeated.

The machine may also be used for picking up hay cocks and either moving or stacking them. And in the case of grain shocks several of them may be picked up in one trip and delivered from the rake at the place where a threshing machine is at work, or otherwise for gathering the shocks.

I have shown the ejector as a solid board but it is evident that it may also be made skeletoned, and many other parts may be much modified without departing from the spirit of my invention.

What I claim is:

1. In a machine of the kind described, a wheel supported frame, a fork-shaped rake pivoted to the front end of the frame, so as to swing up and down with its forwardly extending tines, a motor on the frame, means for applying the motor to the rake to raise, lower and hold it at various inclinations below and above horizontal position; operative connection between one of the ground wheels and the motor for going backward and forward on the ground; and an ejecting device guided to slide back and forth on the tines of the rake, and operative connection between said ejector and the motor; said ejecting device comprising a head guided to slide on the middle tines of the rake and having an upstanding wing by which to move the load forward and beyond the points of the tines.

2. The structure specified in claim 1, said operative connection between the motor and the ejector comprising a guide pulley in the front end of one of the middle tines of the rake, a cable passed over said pulley and having one end attached to the ejector and the other end to a winding drum operatively connected with the motor.

3. The structure specified in claim 1; said means for raising, lowering and holding the rake at various inclinations comprising a cable drum, a clutch-controlled connection between the motor and the drum, and a brake for controlling the rotation of the drum, a cable connecting the rake with the drum, and a guide pulley holding the middle portion of the cable in an elevated position.

In testimony whereof I affix my signature.

LAWRENCE KELLY.